Feb. 28, 1939.         C. STONE         2,149,235
                         EDGER
             Filed Aug. 4, 1937      4 Sheets-Sheet 1
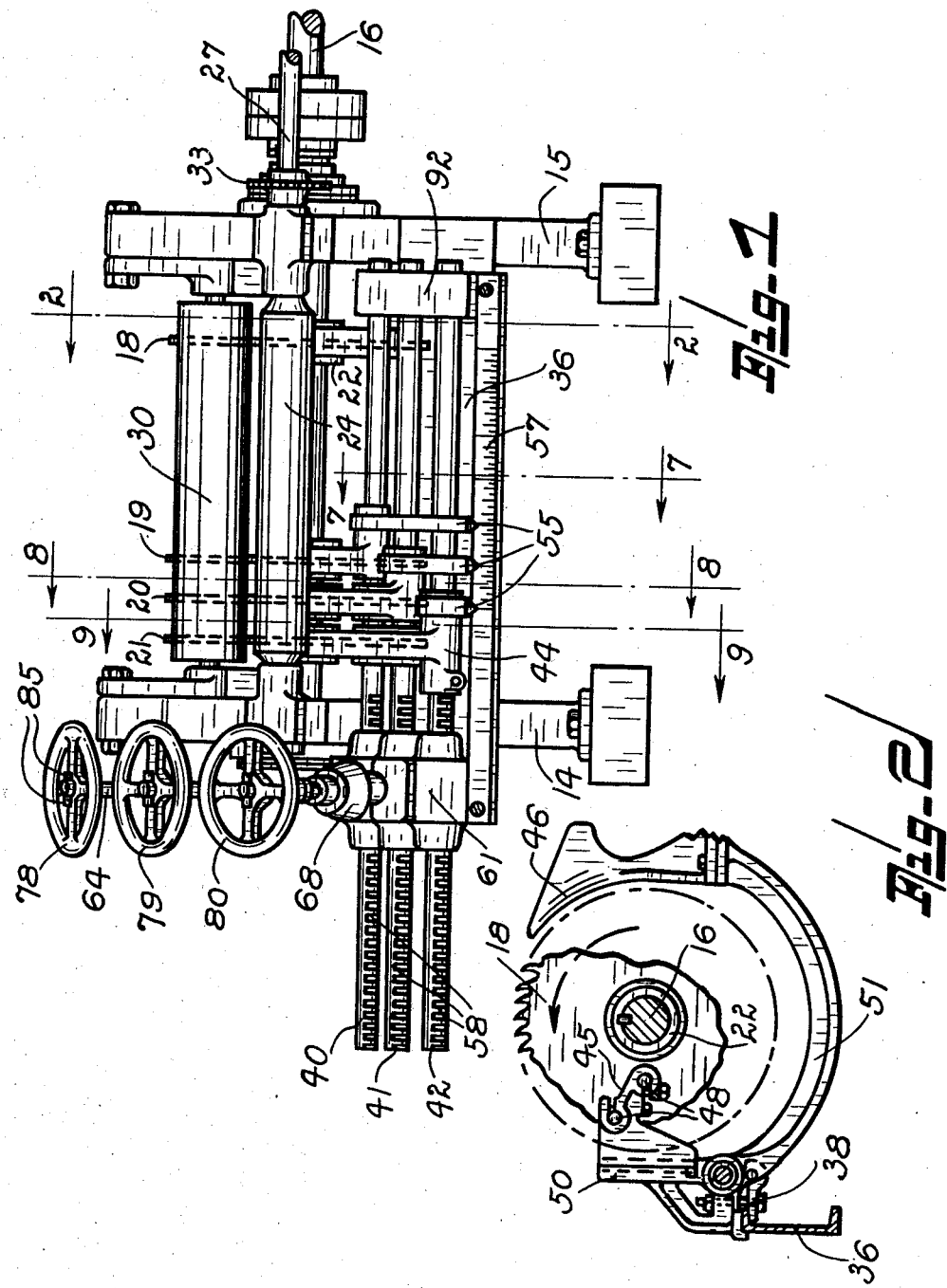
INVENTOR
Carlton Stone
BY
ATTORNEYS Feb. 28, 1939.   C. STONE   2,149,235
EDGER
Filed Aug. 4, 1937   4 Sheets-Sheet 2
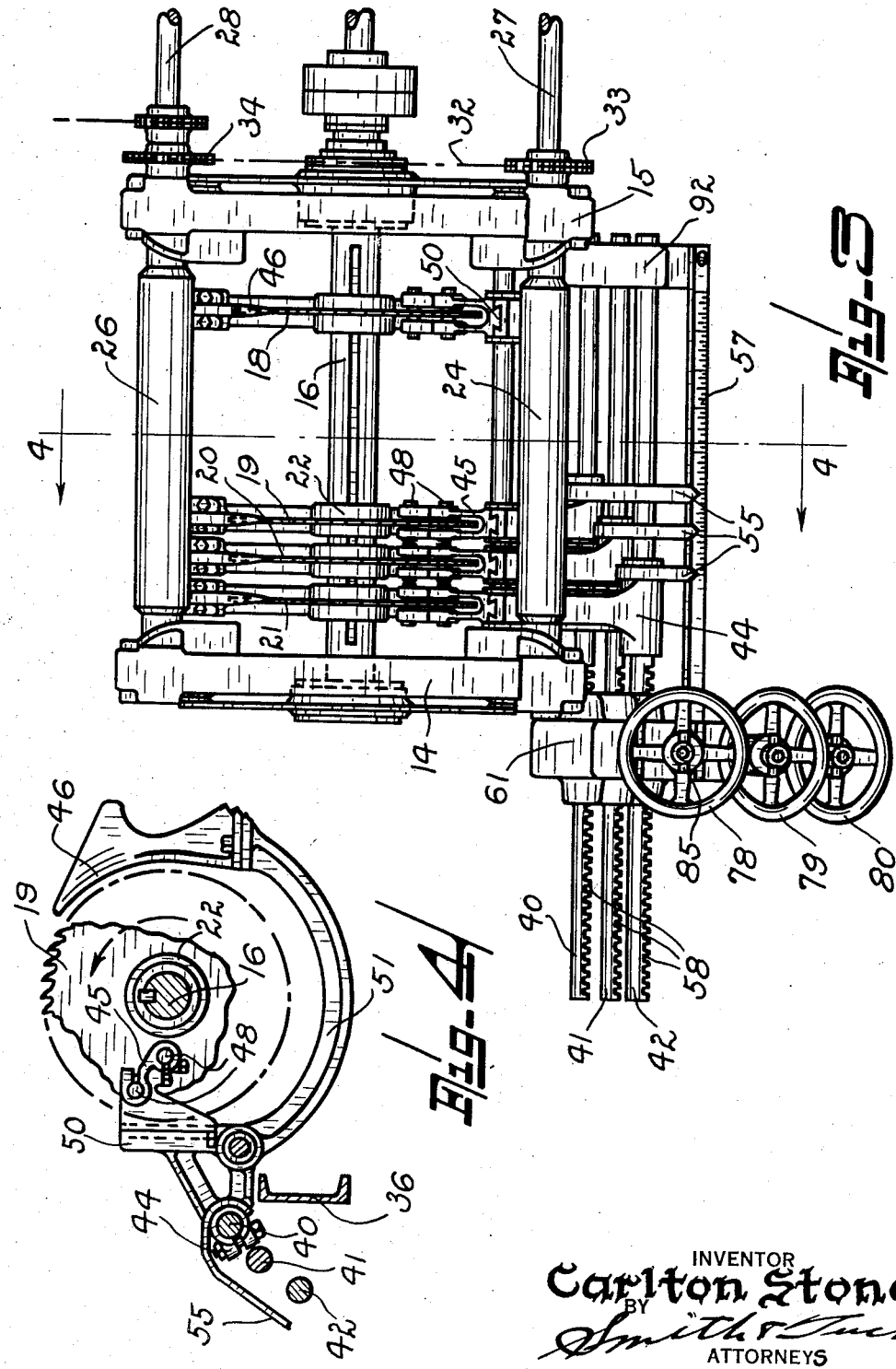
INVENTOR
Carlton Stone
BY
Smith & Tuck
ATTORNEYS Feb. 28, 1939.   C. STONE   2,149,235
EDGER
Filed Aug. 4, 1937   4 Sheets-Sheet 3
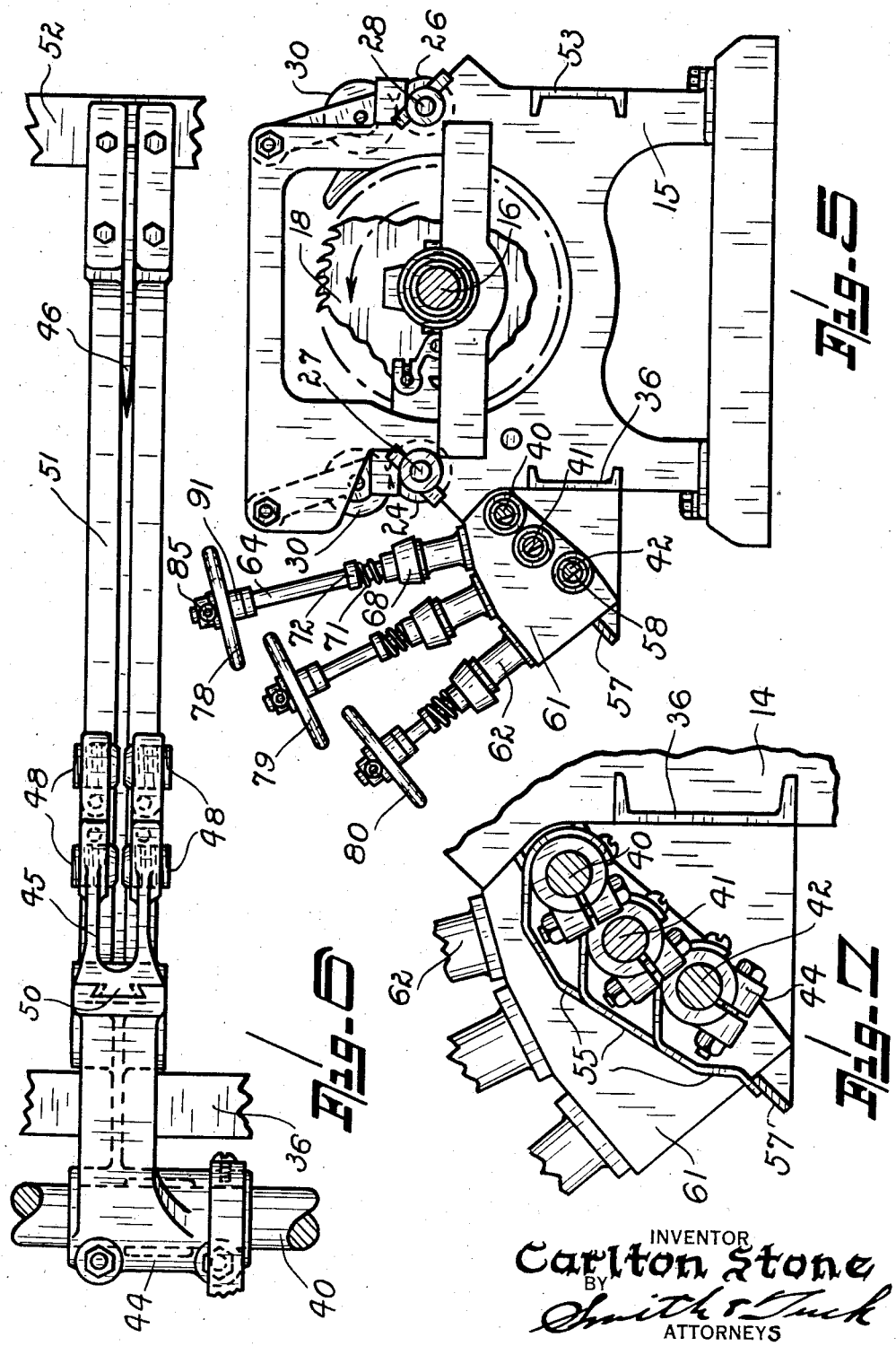
INVENTOR
Carlton Stone
BY
Smith & Tuck
ATTORNEYS Feb. 28, 1939.  C. STONE  2,149,235
EDGER
Filed Aug. 4, 1937  4 Sheets-Sheet 4
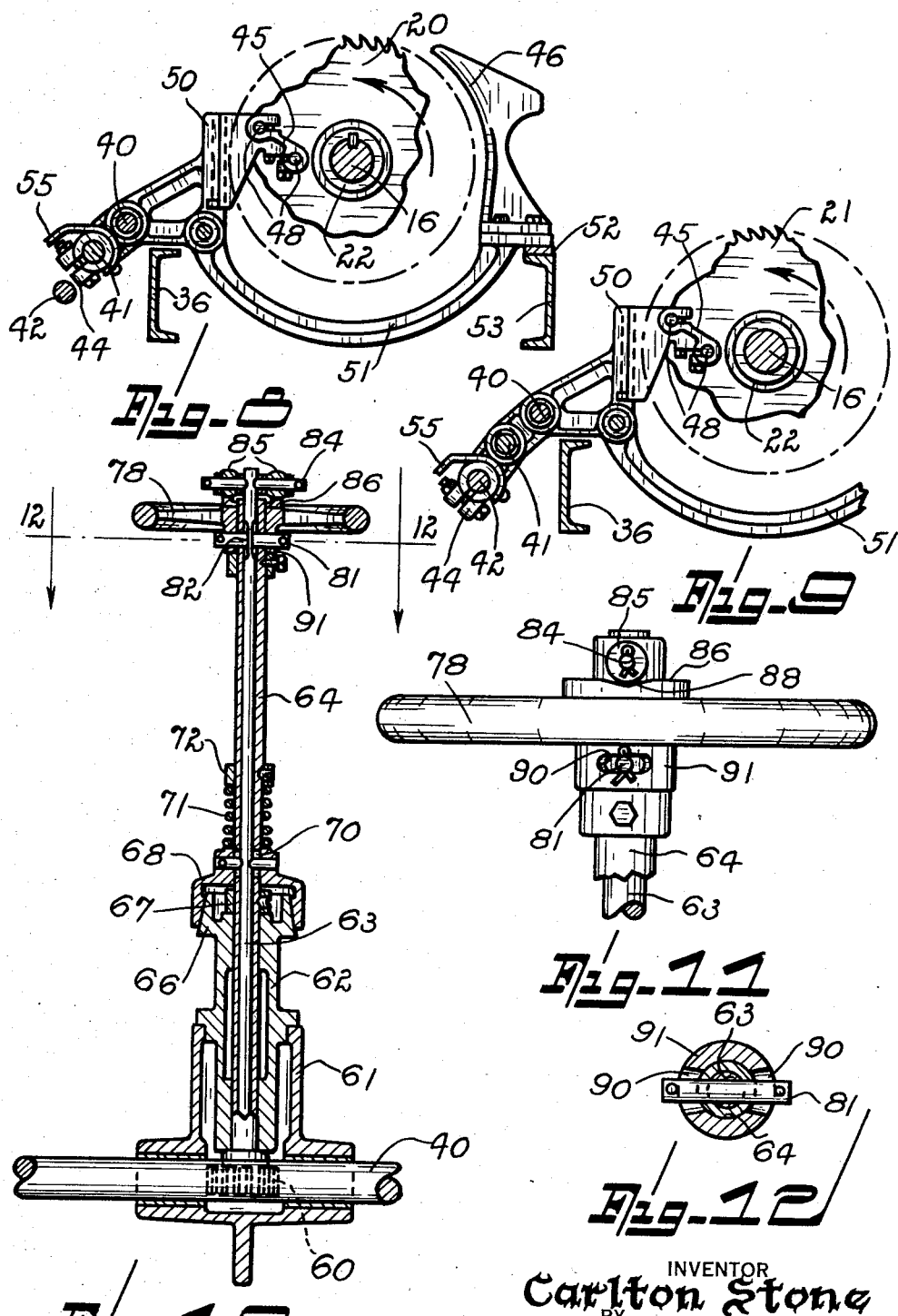
INVENTOR
Carlton Stone
BY
Smith & Tuck
ATTORNEYS Patented Feb. 28, 1939

2,149,235

UNITED STATES PATENT OFFICE 2,149,235

EDGER

Carlton Stone, Duncan, British Columbia, Canada, assignor to Mill Engineering & Supply Company, Seattle, Wash., a corporation of Washington Application August 4, 1937, Serial No. 157,335
In Canada August 22, 1936

5 Claims. (Cl. 143—37)

My present invention relates to the art of saw mill machinery and more particularly to edgers.

The edgers used in saw mills are provided for the purpose of trimming the edges of boards and for producing a plurality of boards, or timbers, from a single sawn slab. In the past the majority of edgers have been controlled by having, normally, one fixed saw and then a plurality of slidable saws mounted upon a single splined, or keyed, power shaft and provided with levers for adjusting them with respect to the fixed saw. The common method of making this adjustment is by the use of relatively long levers adapted to engage positioning notches which, in themselves, make accurate adjustment of the saws difficult and then the handles of the levers invariably are positioned in the path of the moving timber. This adds to the hazard of the work and slows up the material passing through the mill.

With my present equipment I have provided that the edger operator stands well out of the normal flow of material and means is provided which will give an unusually flexible moving and securing means. It is possible to quickly set my equipment to odd dimensions to allow for shrinkage, or for unusual sizes which certain construction or markets may require. Further, inasmuch as the adjustment must be made quickly, I have provided my equipment in such a manner that the saws are normally locked securely in position yet the first movement of the operating means unlocks the saw holder and when the saw has been repositioned it is automatically locked in position the moment the operator releases the operating means. In the various views, I have shown this means as hand wheels.

Other and more specific objects will be apparent from the following description taken in connection with the accompanying drawings, wherein Figure 1 is an end elevation of my device showing the operator's side of the edger.

Figure 2 is a cross-sectional view taken along the line 2—2 of Figure 1.

Figure 3 is a top plan view of my edger.

Figure 4 is a cross-sectional view taken along the line 4—4 of Figure 3.

Figure 5 is an end elevation of my edger.

Figure 6 is an enlarged fragmentary view showing the guide means and saw adjusting means for a single saw.

Figure 7 is a cross-sectional view taken along the line 7—7 of Figure 1.

Figure 8 is a cross-sectional view taken along the line 8—8 of Figure 1 showing the saw guide, or spreader, means together with the saw shifting device employed with each of my movable saws.

Figure 9 is a cross-sectional view along the line 9—9 of Figure 1.

Figure 10 is a cross-sectional view in elevation through one of my saw adjusting and locking devices.

Figure 11 is a side elevation showing the hand wheel and camming arrangement employed with my locking device.

Figure 12 is a cross-sectional view along the line 12—12 of Figure 10.

Referring to the drawings, throughout which like reference characters indicate like parts, 14 and 15 designate the side frame members of my device. These are connected by a plurality of cross members which, in turn, serve various purposes. The main, power-driven shaft 16 is suitably journaled in each of the frame members and has disposed upon it a plurality of movable saws, suitable key arrangements being provided so that the saws can be positively driven by shaft 16 yet will be slidable on the shaft. Each of the saws as 18, 19, 20, 21, is provided with the usual collars 22 so as to give ample bearing for the floating key in shaft 16, and further, to provide the required stability for the saw which must turn at considerable speed. The usual speed rolls are provided to assure the proper positioning of the lumber as it passes through the edger. This consists of power driven speed rolls 24 and 26 which are fixedly journaled in the frame and driven by the power shafts 27 and 28, respectively. Pressure type rolls as 30 are provided above each of the power rolls. These rolls have been purposely omitted from Figure 3 for clarity of illustration. To assure uniform speed the two power rolls are interconnected by a chain belt 32 which is indicated in Figure 3 as engaging sprocket 33 and sprocket 34.

Each saw is controlled by a unit shown in plan view in Figure 6 and, in their specific forms, in Figures 2, 4, 8, and 9. The fixed saw 18 is arranged so that it is clamped upon the cross frame member 36, after the showing of Figure 2, by means of clamp bolt 38. Each of the saw controlling members, however, which control the movable saws, as 19, 20, and 21, is arranged for clamping to the movable bars 40, 41, and 42, after the showing of Figures 4, 8, and 9, respectively. Each saw maneuvering means consists essentially of the clamp member 44, the saw shifter fork 45 and the saw guide 46. The saw shifter is formed as a U-shaped member, having inserted bearing pieces 48, usually formed of lignum vitae. These are clamped into position and are renewable and adjustable for wear. As a matter of convenience to facilitate servicing, each saw shifter 45 is mounted on a dove-tailed base arrangement 50, so that it may be removed quickly as a unit. Saw guide 46 is of a thickness to pass through the saw kerf, it is supported by the curved support member 51. This member is formed preferably integral with clamp member 44 and is provided at its outer end with a rest portion which is possibly best illustrated in Figure 8. A piece of machined metal 52 is secured to the rear cross-tie member 53 and provides an accurate rest to take the weight and provides support for the guide member itself. Each movable saw guiding means is provided with an indicator, as 55. These indicators are arranged to engage a suitable scale as 57 so that the exact position of the saw can be read from the position of the saw operator.

Each of the adjusting bars, as 40, 41, and 42, have a similar adjustment means. It has been found that when quick operation is as desirable as it is in this equipment, the most convenient manner of effecting the adjustment of the saws is to cut a rack gear 58 into one side of each of the slidable bars. Adapted to engage this rack is a gear pinion 60. The exact construction of the operating and locking mechanism will probably be most clearly understood from an examination of Figures 10, 11, and 12. In actual construction I find it most convenient to group all the control mechanisms in a single housing, as 61, but for sake of clarity in Figure 10 I have illustrated a single unit. This consists of housing 61 which has positioned in its upper surface a guide member 62. This guide member provides a guide and bearing for the central shaft 63 and tube 64 which encircles said shaft. The upper end of guide 62 is formed as the male portion of a cone clutch as 66. A set collar 67 which is provided, together with pinion 60, secures the tube 64 against displacement. The female portion of the cone clutch is provided in member 68 which is fixedly secured to shaft 63 and which, by virtue of longitudinally extending slots 70, permits member 68 to move up tube 64 against compression spring 71, which in turn is backed by set collar 72. Hand wheel 78 is secured to the upper end of tube 64 by the through pin 81, which is a body fit in tube 64, and is of smaller size than shaft 63 and passes through the same. An elongated hole, or slot, 82 permits the hand wheel to move with tube 64, longitudinally with shaft 63. At its extreme upper end, shaft 63 is pierced by a third pin 84. This pin is a snug fit in shaft 63 and is provided at either end with rollers 85. Rollers 85 in turn engage the face cam 86 after the showing, particularly, of Figure 11 in which view rollers 85 are shown as engaging the depressions 88 in cam 86.

*Method of operation*

In operating my edger the first concern, once the installation of the machine is made, is to have the fixed saw 18 set in its normal position. This is accomplished by means of the clamping arrangement shown in Figure 2 whereby clamp bolt 38, with its associated parts, secures the saw maneuvering means to the cross-frame member 36. Saw 18 thus trims one margin of the slab. The position of the movable saws of which I have illustrated three in my various views, is then a function of the width of the material and the number of divisions it is to be cut into. Saw 19 is adjusted next, after saw 18. This is accomplished by turning the top of hand wheel 78 toward the direction the saw is to be moved. The first turning of the hand wheel, and this same procedure is true of all the hand wheels as 78, 79, and 80, turns cam 86 underneath rollers 85. This produces an upward movement of rod 63. This upward movement carries with it the female clamp or clutch member 68 and disengages it from its locked relationship with the male portion 66. During this initial movement, by virtue of the transverse slots 90 which are cut in the hub 91 of each of the hand wheels, there is no movement of tube 64. However, if the hand wheel movement is continued, pin 81 engages the end of slot 90 and turns tube 64. Tube 64 is fixedly secured to pinion 60 and turns the same with it, thus producing a longitudinal movement of bar 40. This bar being suitably guided in housing 61 and in guide 92, moves in the same direction as the top of the hand wheel is turned. This carries with it the saw maneuvering means illustrated in Figure 6, by virtue of the clamp members 44 being fixedly clamped thereto. When the saw has been moved to its desired position so that indicator 55 is at its appropriate position with regard to scale 57, the operator releases the hand wheel and rollers 84, under urging of spring 71, find the depressions 88 in cam 86, thus dropping the female member 68 of the clutch into locked engagement with the male member 66, effectively locking the entire moving mechanism against further movement.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

I claim:

1. In an edger the combination of a plurality of circular saws operatively disposed on a power driven shaft; a plurality of slidable rack bars one for each movable saw; a plurality of saw shifter forks, one for each saw, fixedly secured to said slidable rack bars; actuating and locking means for each of said rack bars, consisting of, a pinion adapted to engage said rack; a hollow shaft operatively connecting a hand wheel and said pinion; guide means for said hollow shaft having formed on its upper end a clutch member; a shaft disposed within said hollow shaft having fixedly secured to it a clutch member complemental to the clutch member on said guide means, and means for moving said shaft longitudinally with respect to said hollow shaft.

2. In an edger the combination of a plurality of circular saws operatively disposed on a power driven shaft; a plurality of slidable rack bars one for each movable saw; a plurality of saw shifter forks one for each saw, fixedly secured to said slidable rack bars; actuating and locking means for each of said rack bars, consisting of, a pinion adapted to engage said rack; a hand wheel having a cam on its upper face; a tube operatively connecting said hand wheel and said pinion; guide means for said tube having formed on its upper end a clutch member; a central shaft disposed within said tube having fixedly secured to it a clutch member complemental to the clutch member on said guide means; cam following means secured to said central shaft disposed to engage said hand wheel cam in a manner to move said central shaft longitudinally with respect to said tube.

3. In an edger the combination of a plurality of circular saws operatively disposed on a power driven shaft; a plurality of slidable rack bars one for each movable saw; a plurality of saw shifter forks one for each saw, fixedly secured to said slidable rack bars; actuating and locking means for each of said rack bars, consisting of, a pinion adapted to engage said rack; a hand wheel having a cam on its upper face; a tube operatively connecting said hand wheel and said pinion; means for securing the hand wheel to the tube permitting a limited movement of the hand wheel before the tube is turned; guide means for said tube having formed on its upper end a clutch member; a central shaft disposed within said tube having fixedly secured to it a clutch member complemental to the clutch member on said guide means; cam following means secured to said central shaft disposed to engage said hand wheel cam.

4. In an edger the combination of a plurality of circular saws operatively disposed on a power driven shaft; a plurality of slidable rack bars one for each movable saw; a plurality of saw shifter forks one for each saw, fixedly secured to said slidable rack bars; actuating and locking means for each of said rack bars, consisting of, a pinion adapted to engage said rack; a hand wheel having a cam on its upper face; a tube operatively connecting said hand wheel and said pinion; means for securing the hand-wheel to the tube permitting a limited movement of the hand wheel before the tube is turned; guide means for said tube having formed on its upper end a clutch member; a central shaft disposed within said tube having fixedly secured to it a clutch member complemental to the clutch member on said guide means; cam following means secured to said central shaft disposed to engage said hand wheel cam in a manner to move the central shaft sufficient to release the complemental clutch during the limited movement of the hand wheel and before the tube is turned.

5. In an edger, the combination of saw shifting means consisting of a longitudinal movable bar having a gear rack thereon; a pinion in mesh with the rack; a housing positioning the pinion and terminating in one portion of a clutch; a pinion shaft formed as a tube encircling a central shaft both of which extend through the axis of the clutch member; a complemental portion of the clutch secured to the central shaft but having vertical movement on the shaft encircling tube; a hand wheel on the tube, its upper hub being a face cam having depressions therein, followers secured to the central shaft and normally lying in the cam depressions, a pin through the hub of the hand wheel capable of vertical movement in the shaft and limited longitudinal movement in the tube.

CARLTON STONE.